(12) United States Patent
Browning et al.

(10) Patent No.: US 6,981,243 B1
(45) Date of Patent: Dec. 27, 2005

(54) METHOD AND APPARATUS TO DEBUG A PROGRAM FROM A PREDETERMINED STARTING POINT

(75) Inventors: Luke Matthew Browning, Austin, TX (US); Kenneth Bernard Rozendal, Austin, TX (US); Suresh Eswara Warrier, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 984 days.

(21) Appl. No.: 09/620,714

(22) Filed: Jul. 20, 2000

(51) Int. Cl.$^7$ ............................................. G06F 9/44
(52) U.S. Cl. ................................................ 717/124
(58) Field of Search ....................... 717/124

(56) References Cited

U.S. PATENT DOCUMENTS

| | | | | |
|---|---|---|---|---|
| 5,560,009 A | * | 9/1996 | Lenkov et al. | 717/124 |
| 5,590,330 A | * | 12/1996 | Coskun et al. | 717/126 |
| 5,655,072 A | * | 8/1997 | Wolff | 714/25 |
| 5,870,607 A | * | 2/1999 | Netzer | 717/127 |
| 6,026,362 A | * | 2/2000 | Kim et al. | 705/1 |
| 6,240,529 B1 | * | 5/2001 | Kato | 714/33 |
| 6,412,106 B1 | * | 6/2002 | Leask et al. | 717/124 |

OTHER PUBLICATIONS

Agrawal, Hiralal, DeMillo, Richard A., Spafford, Eugene H. "An Execution-Backtracking Approach to Debugging", IEEE May 1991, p. 21-26, retrieved from IEEE database Jan. 23, 2003.*

Chen, Yuqun, Plank, James S., Li, Kai, "CLIP: A Checkpointing Tool for Message-Passing Paralled Programs", ACM 1997, retrieved from ACM Portal database, Jan. 23, 2003.*
Li, Kai, Naughton, Jeffrey F., Plank, James S., "Real-Time, Concurrent Checkpoint for Parallel Programs", 1990 ACM p. 79-88 retrieved from ACM Portal database Jan. 23, 2003.*
Netzer, Robert H.B., Xu, Jian, "Adaptive Message Logging for Incremental Program Replay", IEEE 1993, p. 32-39, retrieved from IEEE database Jan. 23, 2003.*

* cited by examiner

Primary Examiner—Tuan Dam
Assistant Examiner—Mary Steelman
(74) Attorney, Agent, or Firm—Duke W. Yee; Thomas E. Tyson; Wayne P. Bailey

(57) ABSTRACT

A method and apparatus allow a programmer to repeatedly debug a program from the same starting point. The entire process state of the process can be saved at any time in the course of a debugging session to a disk file, called the checkpoint file. Now registers or memory may be modified, if necessary, and the program may be brought back to the same starting point where the state had been previously saved by resuming from the checkpoint file. The method and apparatus allow the state of all the programs to be saved multiple times and resumed from any one of those states. The debugging of a problem is considerably facilitated by not having to start from scratch to debug the problem as the last saved state of the program can be used to start the debugging.

29 Claims, 3 Drawing Sheets

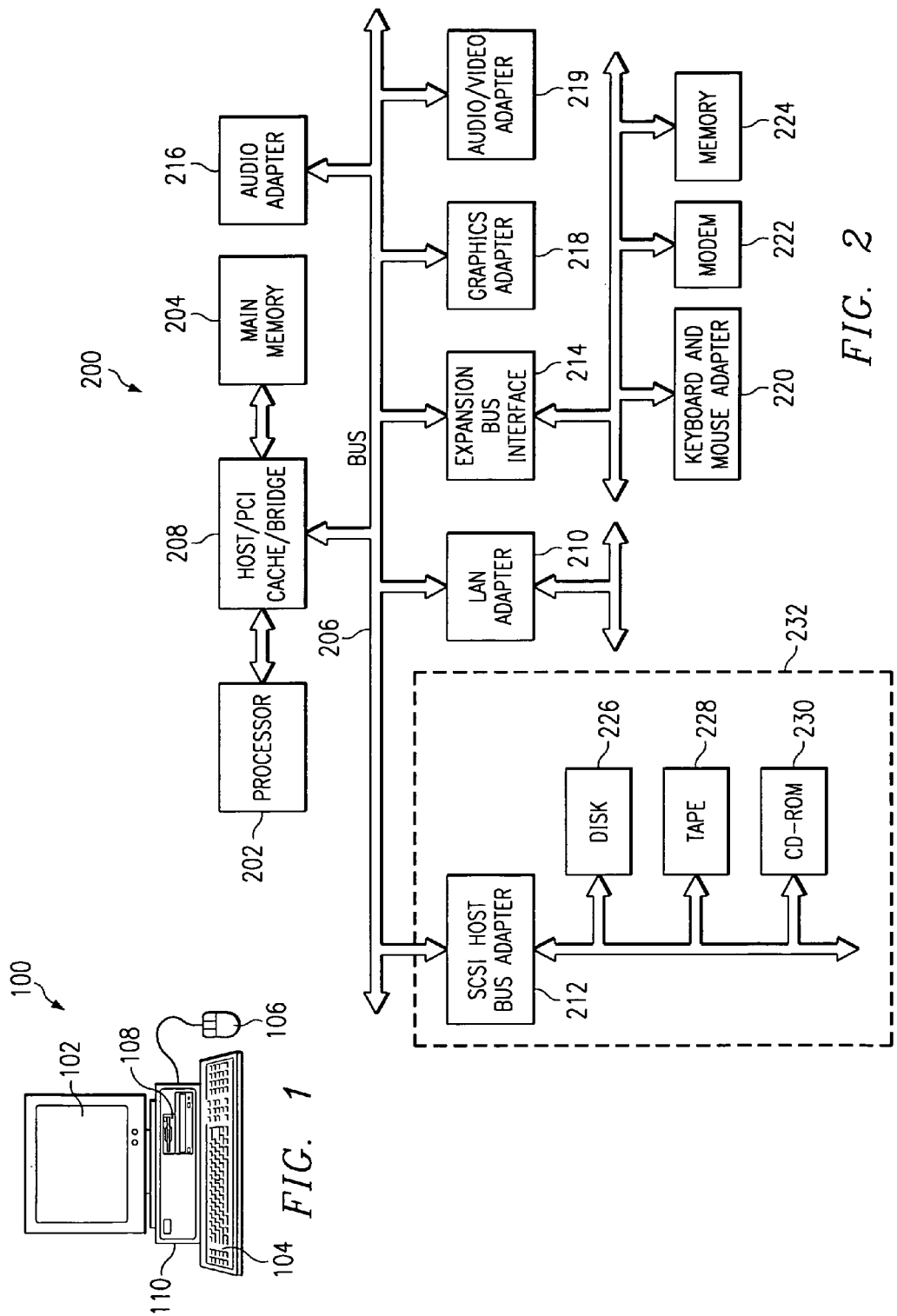

METHOD AND APPARATUS TO DEBUG A PROGRAM FROM A PREDETERMINED STARTING POINT

BACKGROUND OF THE INVENTION

1. Technical Field

The present invention relates to an improved data processing system and, in particular, to a method and apparatus for debugging a program or programs. Still more particularly, the present invention provides a method and apparatus for resuming debugging from a predetermined starting point.

2. Description of Related Art

A computer program, also referred to as software, is a set of instructions that directs the functioning of various computer hardware resources in order to accomplish a particular task. In order to run a computer program, that program is typically loaded into the computer's main memory, where each instruction within the program is stored at a unique location, specified by an address.

One thing that all programs have in common is the need to ensure that they actually perform the task that they are designed to perform. The act of making this determination is generally referred to as testing the software, and the act of identifying the cause of a known problem, or "bug", in a program is called "debugging" the software. To facilitate this process, computer programs, called "debuggers" have been created. A debugger supplies a program control interface to the programmer that allows one to do such things as executing only one program instruction at a time (referred to as "single stepping" the program), determining what the next instruction to be executed is, examining and/or modifying computer register and memory locations, and setting breakpoints at particular locations within the program, whereby computer program execution will continue unimpeded until the breakpoint is the next location in the program that is to be executed by the computer. These features, and others, greatly assist the programmer in determining whether the sequence of program instruction execution is as expected, and whether the correct data is being moved from one computer resource to another. This view into the actual operation of the program allows the programmer to identify where an error has been made in the program design.

However, using prior art debugging systems, the user must step through the entire process until a breakpoint is encountered. While prior art debuggers allow the user to set points at which the process will stop, no technique exists which allows the user to set a state from which debugging will begin. For long-running programs, which crash after several hours of running, the programmer must start from scratch to debug the problem. Therefore, a need exists for a method and apparatus for debugging a program from a predetermined starting point.

SUMMARY OF THE INVENTION

The present invention provides a new way to use debuggers to debug a program or programs from a predetermined starting point. The entire process state of the process or processes can be saved at any time in the course of a debugging session to a disk file by the debugger through a system call. This disk file is also called a checkpoint file. Now registers or memory may be modified, if necessary, and the program or programs continued. At any time, the current execution of the programs may be terminated and the programs brought back to the same starting point where their state had been previously saved by resuming from the checkpoint file using another system call. Now a new set of registers or memory may be modified and the programs continued again.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the present invention may be implemented;

FIG. 2 is a block diagram of a data processing system is shown in which the present invention may be implemented;

DETAILED DESCRIPTION OF THE PREFERRED EMBODIMENT

Figure 3:
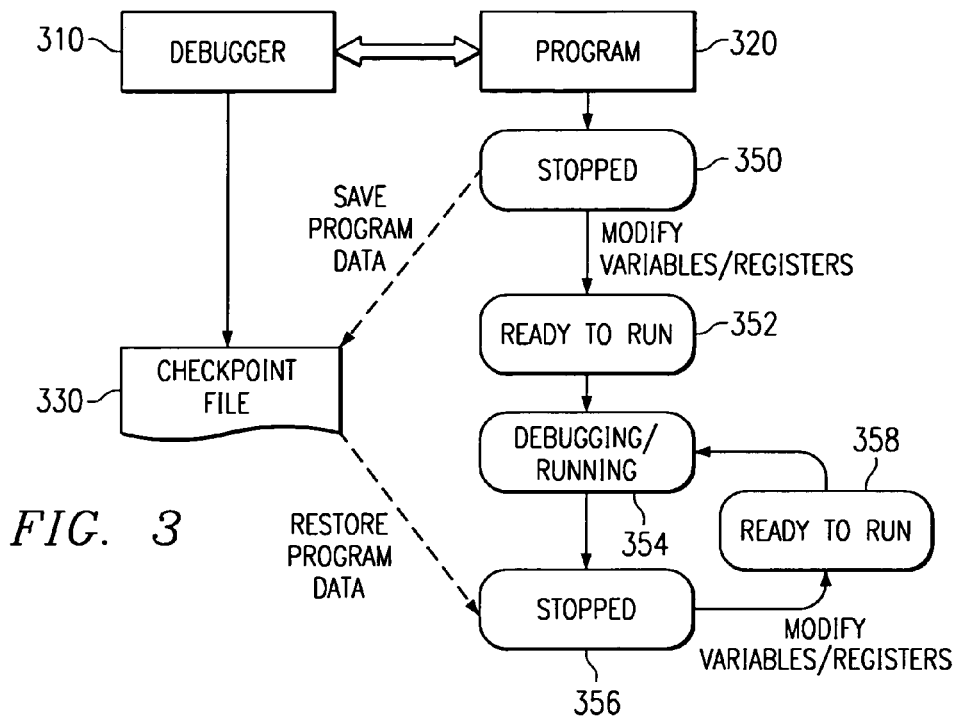
FIG. 3 is a data flow diagram of the operation of a debugger with checkpoint/restart facilities according to a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes a system unit 110, a video display terminal 102, a keyboard 104, storage devices 108, which may include floppy drives and other types of permanent and removable storage media, and mouse 106. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230, as noted by dotted line 232 in FIG. 2 denoting optional inclusion. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a Personal Digital Assistant (PDA) device, which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226–230.

The operating system creates software copies of the processor and the memory and assigns them to programs. Each instance of a program executing in memory is called a "process." A program is thus a passive entity, such as the contents of a file stored on disk, whereas a process is an active entity. The process includes the value of the "program counter" specifying the next instruction to execute, the contents of processor's registers, the process "stack," a data section containing global values, and a "user block" which contains information about opened files and devices, pending signals, signal handlers, etc. The process stack contains temporary data, such as sub-routine parameters, return addresses, and temporary variables. The "process image" defines a process in memory and includes all information about a process as described above.

The operating system will allow a process to create new processes by use of a system call. The relationship between processes is often referred to as the parent-child relationship with the calling process referred to as the parent of the created process, which is called the child process. For example, a word processing program executes in memory as a process. When the word processing process calls a spell checker program, a child process is created whose parent is the word processing process.

The present invention provides a debugger combined with a child process that can be checkpointed and restarted. In a preferred embodiment, the debugger, executing in memory as a process, creates a child process for the program being debugged. The program can then, in turn, create further child processes. The debugger, which is the parent process, has control over the child processes. The debugger of the present invention may save the image of all processes under control of the debugger in a checkpoint file and recreate the image of the processes from the checkpoint file to resume debugging from that state. Thus, the present invention provides a mechanism for resuming debugging from a saved state, allowing the programmer to modify registers and memory variables and resume debugging from a known state.

A checkpoint is a snapshot of the image of a process, which is saved on non-volatile storage, such as disk 226 in FIG. 2, and which survives process failure. The checkpoint/restart facilities save information (i.e., checkpoint data) necessary to restart the execution of a process from that point in the program execution at which the information is saved. Upon restart, the checkpointed process may be reloaded into volatile memory, such as main memory 204 in FIG. 2, and the process can resume execution from the checkpointed state. Checkpointing reduces the amount of lost work in the event of a process failure because the checkpointed processes only need to be rolled back to the last checkpoint. Even if the processes complete execution normally or are aborted because of program failure, the processes can be recreated from the image saved in the checkpoint file and debugged from that point instead of starting from scratch.

Processes may be checkpointed and their process image saved in a checkpoint file even when they are not being traced. The present invention also provides a debugger to recreate processes from the checkpoint file and to start tracing them from the point at which they were checkpointed. This use of a debugger to recreate processes from a checkpoint file can potentially save a user several hours or even days of debugging efforts to debug a long-running process that crashes after several hours or days of execution if a checkpoint file containing the process image is created on some interval-basis.

According to a preferred embodiment of the present invention, checkpoint/restart facilities are used to save the state of a process or processes of a program being debugged to a checkpoint file. At any time, the current execution of the program may be terminated and the program brought back to the same starting point where the state had been previously saved by resuming from the checkpoint file using another system call. Now a set of registers or memory may be modified and the program continued again.

With reference now to FIG. 3, a data flow diagram of the operation of a debugger with checkpoint/restart facilities is depicted according to a preferred embodiment of the present invention. A debugger 310 controls the operation of a program 320. Debugger 310 provides a checkpoint/restart facility to save the entire process state of a process or processes being traced including its registers and machine state in a checkpoint file 330. Debugger 310 also provides a way to read the checkpoint file and create the process image from the data saved in the file and resume the process at the point at which it was checkpointed as a traced process.

The program runs until it reaches a stopped state 350, when, for example, it reaches a breakpoint set by the debugger. The entire process image may be saved to the checkpoint file. It may be beneficial to permit only the debugger to checkpoint a traced process. If any process other than the debugger attempts to checkpoint a traced process, the call will fail. It may also be beneficial to allow a debugger process to checkpoint processes that are not being traced by it. For example, multiple processes may be included in a checkpoint/restart group and identified through a common checkpoint/restart group ID (CRID), even though the processes are not all being traced by the debugger. Furthermore, it may be beneficial to checkpoint a traced process that is already running, as well as a traced process stopped in the debugger.

The following is an example of some code to checkpoint a process that is stopped in debugger mode which uses the ptrace( ) system call to communicate between the debugger and the traced process:

```
rc = checkpnt("SV.out", id, CHKPNT_NODELAY|CHKPNT_AND_STOPTRC, "SV.err");
if (rc) {
    printf("Checkpnt failed, errno = %d\n");
    exit(1);
}
/* continue the process to complete the checkpoint request */
rc = ptrace(PT_CONTINUE, pid, (int *)1, 0, 0);
if (rc == -1) {
    printf("Continue failed, errno = %d\n", errno);
    exit(1);
}
/* wait for the process to go to the stopped state after checkpoint */
rc = waitpid(pid, &status, WUNTRACED);
if (rc != pid) {
    printf("Wait failed, rc = %d, errno = %d\n", rc, errno);
    exit(1);
}
/* Make ptrace requests */
```

After the process state is saved in a checkpoint file, registers or variables in memory may be modified and the program is ready to run in state 352. In state 354, the program is running and the debugger is debugging the program. At any time, the current execution of the program or programs may be terminated to enter a stopped state 356, such as at a breakpoint. Thereafter, the program or programs may be brought back to the same starting point where the state had been previously saved by restoring program data from the checkpoint file using another system call.

The following is an example of some code to restart a single process that was checkpointed:

```
rc = restart("SV.out", pid, RESTART_AND_STOPTRC, NULL, "SV.err");
if (rc) {
    printf("restart failed, errno = %d\n");
    exit(1);
}
rc = ptrace(PT_ATTACH, pid, 0, 0, 0);
if (rc) {
    printf("Attach to pid %d failed, errno = %d\n", pid, errno);
    exit(1);
}
/* Need to continue the process after attaching to it so that
 * it can run
 */
kill(pid, SIGCONT);
/* Let the process get to the stopped state */
rc = waitpid(pid, &status, WUNTRACED);
if (rc != pid) {
    printf("Wait failed, rc = %d, errno = %d\n", rc, errno);
    exit(1);
}
/* make ptrace requests */
```

After the state of the processes are restored in stopped state 356, registers or variables in memory may be modified and the program is ready to run in state 358. The program returns to state 354, where the program is running and the debugger is debugging the program.

Figure 4:
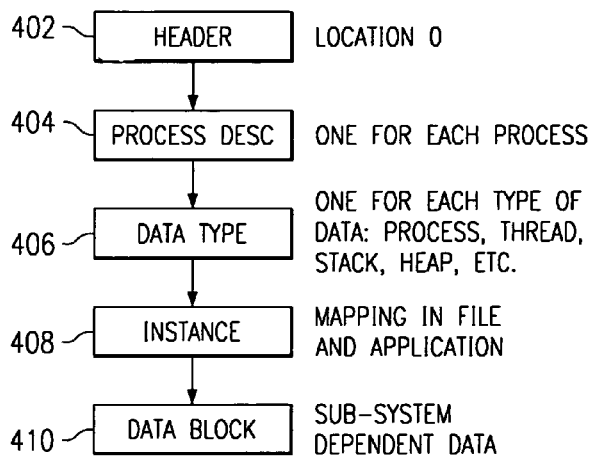
FIG. 4 is a diagram illustrating the components of a checkpoint file and their relationships in accordance with a preferred embodiment of the present invention.

Turning now to FIG. 4, a diagram is shown illustrating the components of a checkpoint file and their relationships in accordance with a preferred embodiment of the present invention. The components of the checkpoint file include a header 402, which is stored at location 0 (zero), and a process descriptor 404 for each process whose image is saved in the checkpoint file. Each process descriptor has a data type 406 for each type of data (e.g., process, thread, stack, heap, etc.) associated with the process descriptor. Each data type has at least one instance 408 mapping in file and application. Each instance of a data type has at least one data block 410 of subsystem dependent data.

Figure 5:
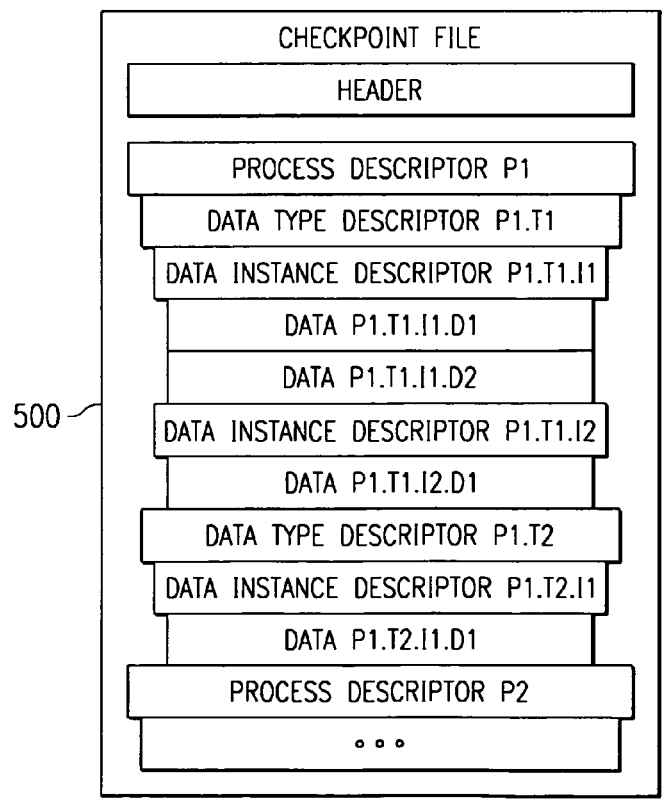
FIG. 5 is a block diagram of an exemplary checkpoint file according to a preferred embodiment of the present invention.

An example of a checkpoint file is presented in FIG. 5. The file 500 comprises a header and two processes P1 and P2. Process P1 has two data types and, hence, two descriptors to represent them, namely P1.T1 and P1.T2. The data type P1.T1 has two instances associated with it, namely P1.T1.I1 and P1.T1.I2. The P1.T1.I1 instance has two blocks of data, P1.T1.I1.D1 and P1.T1.I1.D2. Data instance P1.T1.I2 has one data block, namely P1.T1.I2.D1. Data type P1.T2 has one instance P1.T2.I1 with one data block, namely P1.T2.I1.D1.

A person of ordinary skill in the art will recognize that the configuration of the checkpoint file described with respect to FIGS. 4 and 5 may vary depending on implementation. Other components may be used in addition to or in place of the components depicted in FIG. 4. For example, the debugger may be used to debug a plurality of programs running concurrently. The debugger may also be implemented in a distributed processing environment. A plurality of debuggers may also be implemented to debug different processes or parts of processes. Furthermore, the checkpoint file in FIG. 5 may also be implemented as another data structure, such as a linked list or database, rather than a flat file. Also, as mentioned earlier the checkpoint file may be created even when processes are not being traced, such as when the checkpoint file is created by a non-debugger, in the same format as described above, but used by the debugger in the same way.

Figure 6:
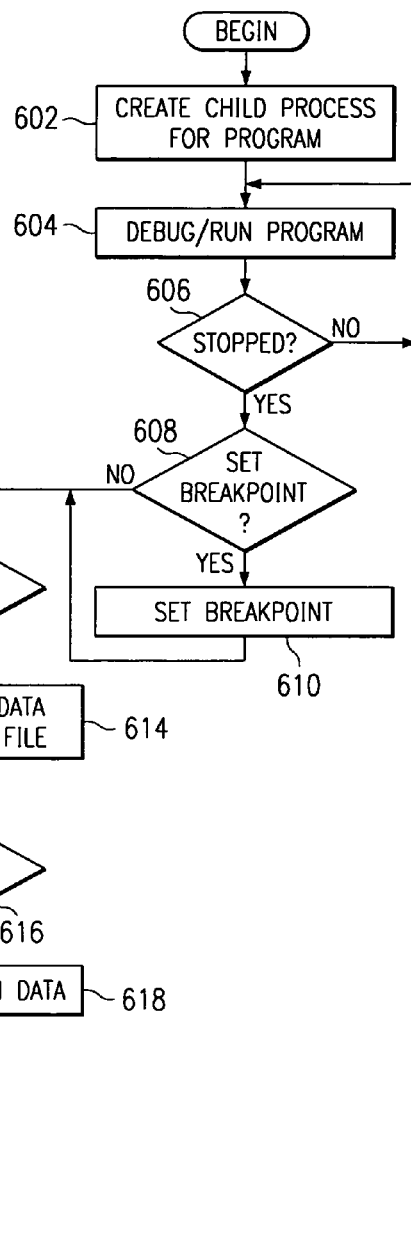
FIG. 6 is a flowchart of the operation of a debugger according to a preferred embodiment of the present invention.

Turning next to FIG. 6 a flowchart of the operation of a debugger is shown in accordance with a preferred embodiment of the present invention. The debugger process begins and creates a child process for the program being debugged (step 602). In step 604, the debugger process is debugging the program in a running state. Next, a determination is made as to whether the program is stopped (step 606). The program may be stopped because of a crash, because a breakpoint is encountered, or due to a system call by the debugger process. If the program is not stopped, the debugger process continues debugging the program in a running state in step 604.

If the program is stopped in step 606, a determination is made as to whether the user wishes to set a breakpoint (step 608). If the debugger process is to set a breakpoint, the debugger process sets the breakpoint (step 610) and a determination is made as to whether the debugger process is to save a checkpoint (step 612). If the debugger process determines that a breakpoint is not to be set in step 608, the debugger process proceeds directly to step 612 to determine whether a checkpoint is to be saved.

The debugger may set a breakpoint or save a checkpoint in response to an event. For example, the programmer may instruct the debugger to stop the program, set a breakpoint, and save a checkpoint after three hours of running, regardless of the instructions being executed or the state of the processes under the control of the debugger. In this example, the event of three hours of running would indicate to the debugger that a breakpoint is to be set and that a checkpoint is to be saved. The debugger may also be instructed to save a checkpoint periodically or before or after a specific instruction is executed.

If a checkpoint is to be saved in step 612, the debugger saves process data to a checkpoint file (step 614) and a determination is made as to whether the debugger is to restore the image of the process from a checkpoint file (step 616). If the debugger process determines that a checkpoint is not to be saved in step 612, the debugger process proceeds directly to step 616 to determine whether the image of the process is to be restored from a checkpoint file.

If the image of the process is to be restored from a checkpoint file in step 616, the debugger restores process data from the checkpoint file (step 618) and a determination is made as to whether the debugger is to modify registers and/or memory variables (step 620). If the debugger process determines that the process image is not to be restored in step 616, the debugger process proceeds directly to step 620 to determine whether registers and/or memory variables are to be modified.

The debugger may also restore the image of the process being debugged and modify registers or memory variables in response to an event. For example, the debugger may be instructed to run between a checkpoint and breakpoint repeatedly using a plurality of register or memory variable values and output results.

If registers and/or memory variables are to be modified in step 620, the debugger modifies the values (step 622) and a determination is made as to whether the debugger process is to terminate (step 624). If the debugger process determines that registers and/or memory variables are not to be modified in step 620, the debugger process proceeds directly to step 624 to determine whether the debugger process is to terminate.

If the debugger process determines that debugging is to terminate in step 624, the debugger process ends. Otherwise, the debugger process continues debugging the program in a running state in step 604.

Thus, the present invention provides a way to save the entire process image of a process being traced including its registers and machine state in a file called the checkpoint file. It also provides a way to read a checkpoint file and to recreate the process image from the state saved in the file and resume it at the point where it was checkpointed as a traced process. A programmer debugging an especially insidious bug has an opportunity to try alternative values for registers and memory variables and run through the same computation window. The present invention also allows a programmer to debug a problem that may occur after several hours of running without the need to run the program from the beginning every time registers or memory variables are modified.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, while the description of the invention and any examples herein may be specific to the UNIX operating system, a person of ordinary skill in the art will recognize that the present invention may be implemented in any operating system. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for debugging a process from a starting point, comprising:
   initiating debugging of the process;
   saving a process state in response to a first event to form a stored process state;
   retrieving the stored process state in response to a predefined event; and
   reinitiating debugging from the stored process state.

2. The method of claim 1, wherein the first event occurs periodically.

3. The method of claim 1, wherein the process state is saved in a checkpoint data structure.

4. The method of claim 3, wherein the checkpoint data structure is a checkpoint file.

5. The method of claim 3, wherein the checkpoint data structure includes a process descriptor for the process.

6. The method of claim 5, wherein the checkpoint data structure further includes at least one data type descriptor for at least one data type corresponding to the process.

7. The method of claim 6, wherein the checkpoint data structure further includes at least one instance descriptor for at least one instance of data corresponding to each of the at least one data type.

8. The method of claim 7, wherein the checkpoint data structure further includes at least one data block corresponding to each of the at least one instance descriptor.

9. The method of claim 1, further comprising the step of modifying at least one register or memory variable before resuming debugging from the stored process state.

10. The method of claim 1, wherein the process state is saved when the program is in a stopped state.

11. The method of claim 10, wherein the stopped state is at a breakpoint.

12. The method of claim 1, wherein the first event is a breakpoint and the predefined event is a checkpoint, and further comprising the step of repeatedly running between the checkpoint and the breakpoint for a plurality of times.

13. The method of claim 12 wherein variable values are automatically modified after retrieving the stored process state for the checkpoint.

14. A method in a data processing system for debugging a process from a starting point, comprising:
   initiating debugging of the process;
   saving a process state in response to a first event to form a stored process state;
   retrieving the stored process state in response to a second event; and
   reinitiating debugging from the stored process state, wherein the process has control over at least one child process and the process state includes a process descriptor for each of the at least one child process.

15. An apparatus for debugging a process from a starting point, comprising:
   a processor; and
   a memory electrically connected to the processor, the memory having stored therein a program to be executed on the processor for performing the following steps:
      initiating debugging of the process;
      saving a process state in response to a first event to form a saved process state;
      retrieving the saved process state in response to a predefined event; and
      reinitiating debugging from the saved process state.

16. The apparatus of claim 15, wherein the first event occurs periodically.

17. The apparatus of claim 15, wherein the process state is saved in a checkpoint data structure.

18. The apparatus of claim 17, wherein the checkpoint data structure is a checkpoint file.

19. The apparatus of claim 17, wherein the checkpoint data structure includes a process descriptor for the process.

20. The apparatus of claim 19, wherein the checkpoint data structure further includes at least one data type descriptor for at least one data type corresponding to the process.

21. The apparatus of claim 20, wherein the checkpoint data structure further includes at least one instance descriptor for at least one instance of data corresponding to each of the at least one data type.

22. The apparatus of claim 21, wherein the checkpoint data structure further includes at least one data block corresponding to each of the at least one instance descriptor.

23. The apparatus of claim 15, wherein program further comprises the step of modifying at least one register or memory variable before resuming debugging from the retrieved process state.

24. The apparatus of claim 15, wherein the process state is saved when the program is in a stopped state.

25. The apparatus of claim 24, wherein the stopped state is at a breakpoint.

26. An apparatus for debugging a process from a starting point, comprising:
   a processor; and
   a memory electrically connected to the processor, the memory having stored therein a program to be executed on the processor for performing the following steps:
      initiating debugging of a process;
      saving a process state in response to a first event to form a saved process state;
      retrieving the saved process state in response to a second event; and
      reinitiating debugging from the saved process state, wherein the process has control over at least one child process and the process state includes a process descriptor for each of the at least one child process.

27. A computer program product embodied in a computer readable medium for debugging a process from a starting point, comprising:
   instructions for initiating debugging of the process;
   instructions for saving a process state in response to a first event to form a saved process state;
   instructions for retrieving the saved process state in response to a predefined event; and
   instructions for reinitiating debugging from the saved process state.

28. A method in a data processing system for debugging a process in a multi-process environment, comprising the steps of:
   initiating a debug process;
   creating a child process from the debug process;
   saving a process state of the child process in response to a first event, to form a stored process state;
   retrieving the stored process state in response to a second event; and
   executing the child process using the stored process state.

29. A method in a data processing system for debugging a process in a multi-process environment, comprising the steps of:
   tracing a process by a debugger;
   saving a process state of the traced process and a process state of another process that is not being traced by the debugger;
   retrieving the saved process states; and
   reinitiating debugging of the process using the retrieved process states.

* * * * *